M. OVERPACK.
COOKING UTENSIL.
APPLICATION FILED JULY 17, 1914.
1,159,078.
Patented Nov. 2, 1915.
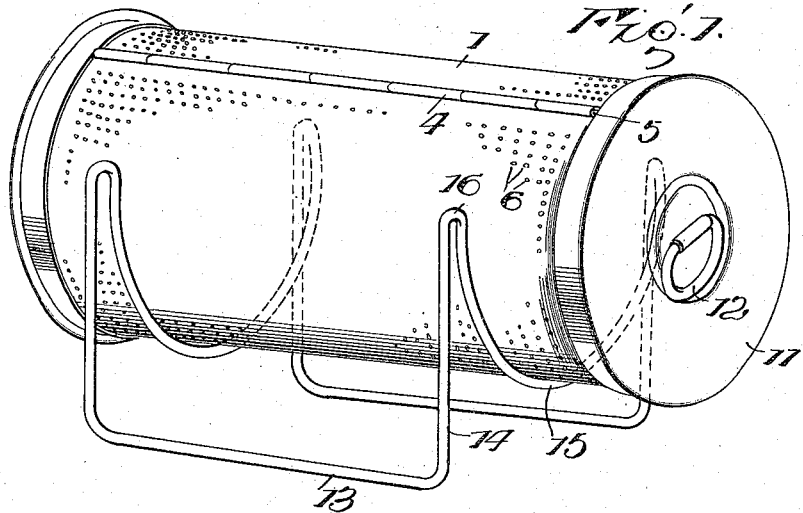
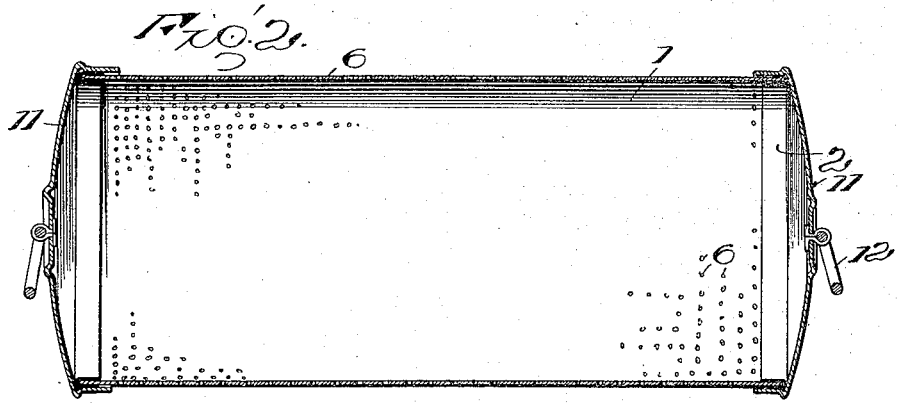
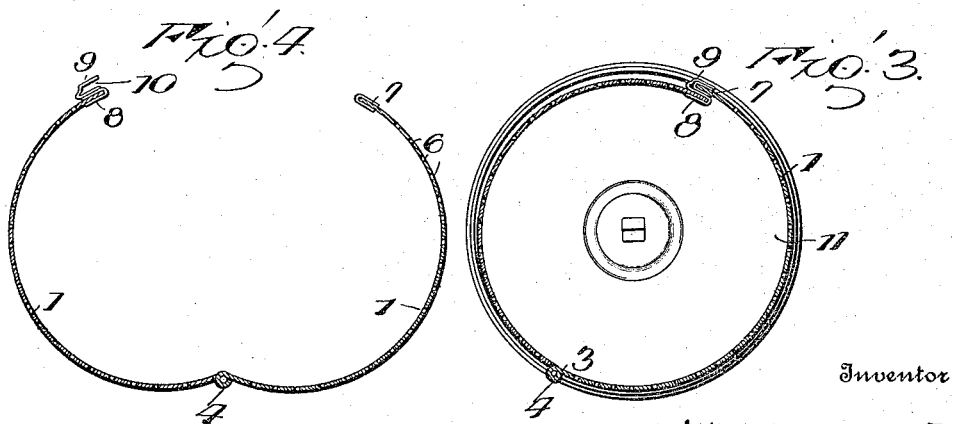
Inventor
Millie Overpack
Witnesses
By
Attorneys

UNITED STATES PATENT OFFICE.

MILLIE OVERPACK, OF MANISTEE, MICHIGAN.

COOKING UTENSIL.

1,159,078.   Specification of Letters Patent.   Patented Nov. 2, 1915.

Application filed July 17, 1914. Serial No. 851,656.

*To all whom it may concern:*

Be it known that I, MILLIE OVERPACK, citizen of the United States, residing at Manistee, in the county of Manistee and State of Michigan, have invented certain new and useful Improvements in Cooking Utensils, of which the following is a specification.

This invention relates to cooking utensils and more particularly to a utensil for use in cooking dressing.

It is one aim of the invention to provide a cooking utensil which may be employed for the purpose of cooking dressing with meat of any kind as well as with fowl, which has heretofore been impractical owing to the difficulty in making pockets in certain cuts of meat.

The invention also has as its object to provide a cooker of the type mentioned which may be employed for the purpose of cooking any desired quantity of the dressing with any desired quantity of meat.

The cooking of dressing with fowl or with other kind of meat having a pocket cut therein presents numerous disadvantages. No more dressing can be cooked in this manner than is sufficient to fill the fowl or the pocket cut in the meat and only that portion of the dressing which is exposed at the surface of the fowl or at the mouth of the pocket can be basted, the portion of the dressing within the fowl or pocket remaining in a soggy condition which renders it unattractive to serve and liable to crumble into small pieces.

It is therefore the further aim of the present invention to provide a cooking utensil for the purpose above mentioned, which will, in its use, subject substantially all portions of the mass of dressing to the steam from the cooking meat or fowl and which will further permit of the dressing being effectually basted and of its being removed from the roaster before or after the removal of the fowl or other meat so that it may be cooked for any desired length of time.

Furthermore, the invention contemplates providing a cooking utensil for the purpose explained so constructed that the dressing may be cooked in a loaf and therefore present an attractive appearance when served.

In the accompanying drawings: Figure 1 is a perspective view of the cooking utensil embodying the present invention, the said figure illustrating also the support therefor. Fig. 2 is a vertical longitudinal sectional view through the utensil removed from its support. Fig. 3 is a vertical transverse sectional view through the utensil. Fig. 4 is a similar view, illustrating the utensil opened to permit of the removal of the dressing.

Corresponding and like parts are referred to in the following description and indicated in all the views of the accompanying drawings by the same reference characters.

The utensil embodying the present invention comprises a foraminous body which is preferably cylindrical and which consists of hingedly connected sections, the ends of the body being closed by removable caps and the body being supported upon a frame adapted to be disposed upon the bottom of the roaster or utensil in which the meat is being cooked.

The body of the utensil, as stated above, consists of hingedly connected sections and each section is indicated by the numeral 1 and is preferably semi-cylindrical and of foraminous material. The end edges of the sections are provided with beads 2 which assist in retaining the sections in proper shape and one longitudinal edge portion of each section is imperforate, as indicated at 3, and the said portions are slit and bent at intervals so as to form pintle lugs 4, a wire pintle 5 being passed through these lugs whereby to hingedly connect the said sections. As before stated, the sections are of foraminous material and are here illustrated as formed from sheet metal, the perforations being indicated by the numeral 6, but it will be understood that if desired the sections may be formed from wire mesh material, in which event, any other suitable hinge connection may be provided between one of their longitudinal edges. The other longitudinal edge of one of the sections has applied to it a bead 7 consisting of a folded strip of sheet metal receiving in its fold the said edge of the section, and a similar bead or strip 8 of sheet metal is applied to the longitudinal edge of the other section 1. This last-mentioned bead, however, has a flange 9 formed by bending one fold of the sheet metal comprising the bead back upon itself in spaced relation to the outer side of the bead proper so as to provide a channel 10 to receive the beaded edge of the first-mentioned section when the sections are closed upon their hinge connection. At this point it will be readily understood that the body of the utensil may be readily opened by separating the last-mentioned longitudinal edges of the sections comprising the body or, in other words, by disengaging the beaded edge 7 of the first-mentioned section from the channel 10 of the second-mentioned section. In order to close the ends of the body to hold the sections in closed position, caps 11 are provided, these caps being preferably imperforate and one being fitted over each end of the said body in the manner clearly shown in Fig. 2 of the drawings. Each cap is preferably provided with a finger ring 12 by means of which it may be readily removed from the body.

The support for the utensil is preferably in the nature of a wire frame and includes sides 13 provided with upstanding end portions 14 which are preferably vertical, and corresponding end portions of the two sides are connected at the ends of the frame by arcuate supporting portions 15, the wire between the upper end of each portion 14 and supporting portion 15 being bent in the direction of the adjacent end of the frame and downwardly, as indicated at 16. The supporting portions 15 preferably conform substantially to the contour of the body of the utensil so that the body will be firmly supported thereby, it being understood that the body is freely removable and that it may be rotated upon the said supporting portions so as to present fresh portions of the dressing contained within the utensil toward the bottom of the roaster and toward the top of the roaster or top of the oven, and also in order that any desired portion of the mass of dressing may be basted without the necessity of removing the utensil from the roaster.

In the use of the device, the sections comprising the body thereof are closed and one of the caps 11 is applied to one end of the said body. The dressing is then introduced into the body and the other cap is applied to the other end of the body. The utensil and its supporting frame are then placed within the roaster. After the dressing has been cooked, the utensil is removed from its support and the caps are removed from the ends of its body, whereupon the sections may be swung open upon their hinge connection and the loaf of dressing may be removed.

Having thus described the invention, what is claimed as new is:

1. In a cooking utensil of the class described, a hollow body comprising foraminous sections hingedly connected along one side of the body, interengaging means carried by the sections along the other side of the body for limiting the closing movement of the sections, and means closing the ends of the body and holding the sections together.

2. In a cooking utensil of the class described, a hollow body comprising foraminous sections hingedly connected along one side of the body, one of the sections at the other side of the body being provided with a channeled member to receive the free edge of the other section, and means closing the ends of the body.

3. A device for the purpose set forth consisting of semi-cylindrical foraminous sections hinged together along one edge, one of the sections being provided at the opposite edge with a bead, and the other section being provided along the co-acting edge with a channel adapted to receive said bead, and caps fitting over the ends of the sections and closing the same and holding the said sections together.

In testimony whereof I affix my signature in presence of two witnesses.

MILLIE OVERPACK. [L. S.]

Witnesses:
B. R. HENDEL,
R. M. OVERPACK.

Copies of this patent may be obtained for five cents each, by addressing the "Commissioner of Patents, Washington, D. C."